L. B. PERKINS.
Horse-Power.

No. 227,293.        Patented May 4, 1880.

WITNESSES
F. L. Durand
J. J. McCarthy

INVENTOR
Leander B. Perkins
By Alexander Mason
ATTORNEYS

United States Patent Office.

LEANDER B. PERKINS, OF BEEBE STATION, ARKANSAS.

HORSE-POWER.

SPECIFICATION forming part of Letters Patent No. 227,293, dated May 4, 1880.

Application filed January 21, 1879.

*To all whom it may concern:*

Be it known that I, LEANDER B. PERKINS, of Beebe Station, in the county of White, and in the State of Arkansas, have invented certain new and useful Improvements in Horse-Powers; and I do hereby declare that the following is a full, clear, and exact description thereof, reference being had to the accompanying drawings, and to the letters of reference marked thereon, making a part of this specification.

The nature of my invention consists in the construction and arrangement of a horse-power of the class known as "tread-mills," and is intended for cotton-gins, grist-mills, and other machinery.

In order to enable others skilled in the art to which my invention appertains to make and use the same, I will now proceed to describe its construction and operation, referring to the annexed drawings, in which—

Figure 1:
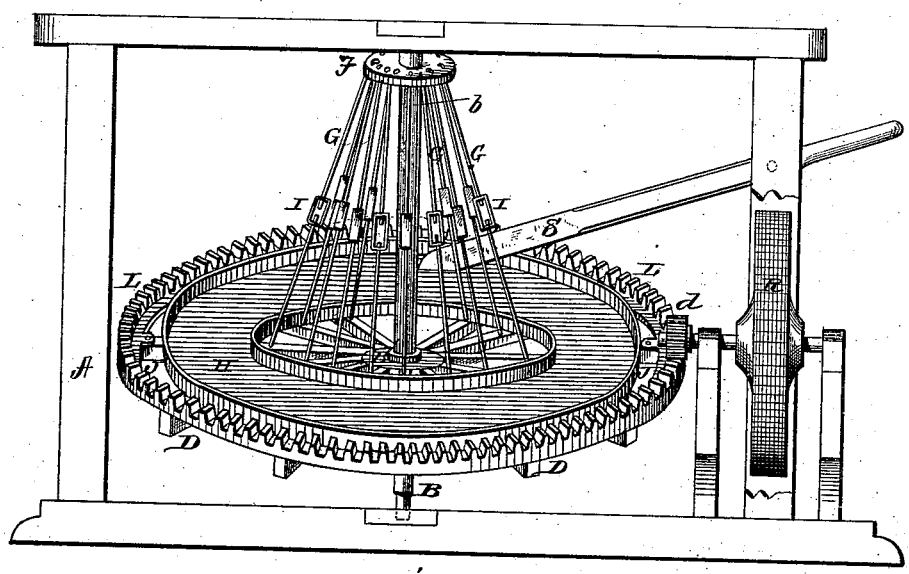
Figure 2:
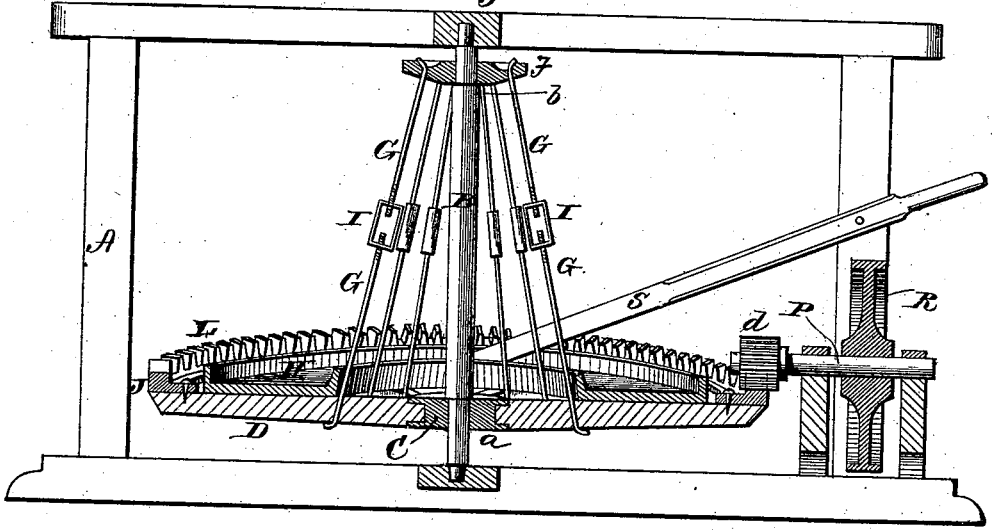

Figure 1 is a front elevation of my horse-power. Fig. 2 is a longitudinal section of the same.

A represents the frame of the horse-power, or it may be the frame of the house or room in which the horse-power is placed.

B is the shaft of the main wheel, which shaft is placed in an inclined position, and has its bearings in suitable boxes or steps in the frame, as shown.

A suitable distance from its lower end, on the shaft B, is fitted an iron hub, C, which is slipped up against a shoulder, $a$, on the shaft and secured by a key or other suitable means. In the periphery of this hub is made a series of mortises for the reception of the inner ends of the arms D.

F represents a metal disk slipped over the upper end of the shaft onto a shoulder, $b$, thereon, and fastened by a key or other suitable means. Near the edge of this disk is made a series of holes corresponding to the arms D. Through these holes are passed a series of rods, G, which come down and pass through the arms D a suitable distance from the outer ends, for the purpose of holding and bracing the wheel. Each box G is made in two pieces, connected by a swivel, I, screwing upon the inner ends of the two parts, whereby the wheel may be adjusted as required and the sagging of any of the arms easily prevented.

H represents the walk for the horses, made of suitable width, and secured on top of the arms D, outside of the points where the rods G are connected to said arms. On the outer ends of the arms D is secured a wooden rim, J, a short distance outside of the walk H, and to this rim are secured the cast-iron cogged segments L by means of bolts, thus forming a continuous cogged rim. Into this rim meshes a pinion, $d$, on a horizontal shaft, P, having a band-wheel, R, secured on it for connecting with the machinery to be driven by a belt.

To the frame A is hung or pivoted a stop-log, S, one end of which rests on the walk H, and is of sufficient weight to balance the horse-power. This stop-log is raised to start the wheel and lowered to stop the same by means of levers suitably arranged for that purpose.

This horse-power is simple in construction, durable, and not liable to get out of order.

Having thus fully described my invention, what I claim as new, and desire to secure by Letters Patent, is—

The combination of the inclined shaft B, having shoulders $a$ $b$, as described, the mortised hub C, radial arms D, supporting the walk H and rim J, with cogged segments L, the disk F, and the divided rods G, provided with the adjusting-swivels I above the tread of the wheel, all constructed and arranged to operate substantially as and for the purposes herein set forth.

In testimony that I claim the foregoing I have hereunto set may hand this 11th day of January, 1879.

LEANDER B. PERKINS.

Witnesses:
C. A. HARRIS,
J. J. McCARTHY.